United States Patent
Ozawa et al.

(10) Patent No.: US 10,922,561 B2
(45) Date of Patent: Feb. 16, 2021

(54) OBJECT RECOGNITION DEVICE AND VEHICLE TRAVEL CONTROL SYSTEM

(71) Applicant: TOYOTA JIDOSHA KABUSHIKI KAISHA, Toyota (JP)

(72) Inventors: Jun Ozawa, Machida (JP); Shinichi Nagata, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/275,672

(22) Filed: Feb. 14, 2019

(65) Prior Publication Data

US 2019/0279006 A1 Sep. 12, 2019

(30) Foreign Application Priority Data

Mar. 6, 2018 (JP) .............................. JP2018-039807

(51) Int. Cl.
| | |
|---|---|
| *G06K 9/00* | (2006.01) |
| *G06T 7/70* | (2017.01) |
| *G05D 1/02* | (2020.01) |
| *G01S 17/931* | (2020.01) |

(52) U.S. Cl.
CPC ........ *G06K 9/00805* (2013.01); *G01S 17/931* (2020.01); *G05D 1/0246* (2013.01); *G06T 7/70* (2017.01); *G06T 2207/30261* (2013.01)

(58) Field of Classification Search
CPC ........... G06K 9/00805; G06K 9/00797; G06K 9/00196; G01S 17/936; G01S 17/58; G08G 1/04; G06T 7/70; G06T 7/0075; G06T 2207/30261; G06T 2207/10016; G06T 2207/30256; G06T 2207/10012; H04N 13/0239; G05D 1/0246; B60R 1/00
See application file for complete search history.

(56) References Cited

U.S. PATENT DOCUMENTS

| | | | |
|---|---|---|---|
| 9,613,280 B2 * | 4/2017 | Kim ......................... | G06T 7/64 |
| 9,688,273 B2 * | 6/2017 | Mudalige .......... | B60W 30/0956 |
| 10,146,223 B1 * | 12/2018 | Luders ............... | G06K 9/00798 |
| 10,150,414 B2 * | 12/2018 | Myers ....................... | H04N 7/18 |
| 10,222,211 B2 * | 3/2019 | Chen .................... | G06K 9/6212 |
| 10,252,717 B2 * | 4/2019 | Avedisov .............. | B60W 30/09 |

(Continued)

FOREIGN PATENT DOCUMENTS

| | | |
|---|---|---|
| JP | 2016-065760 A | 4/2016 |
| JP | 2016-066182 A | 4/2016 |
| JP | 2017-194432 A | 10/2017 |

*Primary Examiner* — Amir Alavi
(74) *Attorney, Agent, or Firm* — Sughrue Mion, PLLC

(57) ABSTRACT

An object recognition device installed on a vehicle includes a first camera detecting a first object, a second camera detecting a second object, a ranging sensor detecting a third object, and a controller. The controller sets first to third determination ranges with respect to detected positions of the first to third objects, respectively, and executes fusion processing by comparing the determination ranges. First and second pixel densities being pixel densities of the first and second objects are determined based on detected distances of the first and second objects, angles of view and numbers of pixels of the first and second cameras, respectively. The controller sets the first determination range larger as the first pixel density is lower, and sets the second determination range larger as the second pixel density is lower.

4 Claims, 13 Drawing Sheets

(56) References Cited

U.S. PATENT DOCUMENTS

| | | | | |
|---|---|---|---|---|
| 10,417,509 B2* | 9/2019 | Fowe | ............... | G06K 9/00818 |
| 10,469,753 B2* | 11/2019 | Yang | ............... | G01S 7/4817 |
| 10,498,966 B2* | 12/2019 | Wheeler | ............... | G01S 7/497 |
| 2017/0294124 A1 | 10/2017 | Baba | | |
| 2017/0309180 A1 | 10/2017 | Baba | | |
| 2019/0279006 A1* | 9/2019 | Ozawa | ............... | G01S 17/58 |

* cited by examiner

| RANGING SENSOR | AVERAGE POSITION RELIABILITY SA | UPPER DECELERATION LIMIT DL |
|---|---|---|
| YES | HIGH | 1.0 G |
| YES | MEDIUM | 0.6 G |
| YES | LOW | 0.35 G |
| NO | HIGH | 0.2 G |
| NO | MEDIUM | 0.1 G |
| NO | LOW | (ONLY WARNING) |

*Fig. 13*

OBJECT RECOGNITION DEVICE AND VEHICLE TRAVEL CONTROL SYSTEM

BACKGROUND

Technical Field

The present disclosure relates to an object recognition device and a vehicle travel control system installed on a vehicle.

Background Art

Patent Literature 1 discloses an object detection device that detects an object by using a radar and a monocular camera. The object detected based on detection information by the radar is a first object. The object detected based on a captured image by the monocular camera is a second object. The object detection device determines whether or not the first object and the second object are close to each other. More specifically, the object detection device sets a first error region centered at a detected point of the first object and a second error region centered at a detected point of the second object. When the first error region and the second error region overlap with each other, the object detection device determines that the first object and the second object are close to each other. When the first object and the second object are close to each other and a difference in a time-to-collision with respect to the two objects is less than a base value, the object detection device determines that the first object and the second object are a same object.

Patent Literature 2 and Patent Literature 3 each also discloses an object detection device similar to that disclosed in Patent Literature 1.

LIST OF RELATED ART

Patent Literature 1: Japanese Unexamined Patent Application Publication No. JP-2016-066182
Patent Literature 2: Japanese Unexamined Patent Application Publication No. JP-2017-194432
Patent Literature 3: Japanese Unexamined Patent Application Publication No. JP-2016-065760

SUMMARY

As disclosed in the above-mentioned Patent Literature 1, when two objects detected by using the radar and the camera satisfy a predetermined condition, the two objects are recognized as the same (identical) object. Such the processing is hereinafter referred to as "fusion processing". According to the technique disclosed in the above-mentioned Patent Literature 1, a predetermined determination range (the error region) is used in the fusion processing for determining whether or not the two objects are the same object.

Here, let us consider a case where multiple cameras having different optical properties are used for detecting an object. In this case, reliability (accuracy) of a detected position of the object is different for each camera. Therefore, if the determination range used in the fusion processing is set to have a same size regardless of the camera type, the determination range may be unreasonably wide or narrow from a viewpoint of true reliability. Setting such the inappropriate determination range deteriorates accuracy of the fusion processing and thus causes false recognition of objects.

An object of the present disclosure is to provide an object recognition technique that can execute fusion processing with high accuracy even when multiple cameras having different optical properties are used.

A first disclosure is directed to an object recognition device installed on a vehicle.

The object recognition device includes:
a first camera;
a second camera having an optical property different from that of the first camera;
a ranging sensor including at least one of a radar and a LIDAR (Laser Imaging Detection and Ranging); and
a control device configured to execute object recognition processing.

The object recognition processing includes:
object detection processing that detects a first object based on a result of imaging by the first camera, detects a second object based on a result of imaging by the second camera, and detects a third object based on a result of measurement by the ranging sensor;
determination range setting processing that sets a first determination range with respect to a detected position of the first object, sets a second determination range with respect to a detected position of the second object, and sets a third determination range with respect to a detected position of the third object; and
fusion processing that compares the third determination range with the first determination range and the second determination range and, when the third object is determined to be a same as at least one of the first object and the second object, recognizes the third object and the at least one as a same object.

A first pixel density being a pixel density of the first object is determined based on a detected distance of the first object, an angle of view and a number of pixels of the first camera.

A second pixel density being a pixel density of the second object is determined based on a detected distance of the second object, an angle of view and a number of pixels of the second camera.

In the determination range setting processing, the control device sets the first determination range larger as the first pixel density is lower, and sets the second determination range larger as the second pixel density is lower.

A second disclosure further has the following feature in addition to the first disclosure.

Angle-of-view variations of the first camera and the second camera caused by oscillation of the vehicle are a first angle-of-view variation and a second angle-of-view variation, respectively.

In the determination range setting processing, the control device sets the first determination range larger as the first angle-of-view variation is larger, and sets the second determination range larger as the second angle-of-view variation is larger.

A third disclosure is directed to a vehicle travel control system.

The vehicle travel control system includes:
the object recognition device according to the first or second disclosure; and
a vehicle travel control device configured to execute vehicle travel control that controls travel of the vehicle based on a result of the object recognition processing.

Position reliability of the first object is higher as the first determination range is smaller.

Position reliability of the second object is higher as the second determination range is smaller.

The vehicle travel control device sets an upper limit of a control amount in the vehicle travel control higher as the position reliability is higher.

According to the present disclosure, the first determination range and the second determination range used in the fusion processing are respectively determined according to pixel densities of the first object and the second object. As the pixel density is lower, the determination range is set to be larger, because reliability of the detected object position is lower. That is to say, the first determination range and the second determination range are flexibly set according to the reliability of the detected object position. Therefore, the first determination range and the second determination range are prevented from being unreasonably wide or narrow. As a result, accuracy of the fusion processing increases and thus false recognition of objects is suppressed.

BRIEF DESCRIPTION OF DRAWINGS

FIG. 13 is a conceptual diagram for explaining the vehicle travel control by the vehicle travel control system according to the embodiment of the present disclosure.

EMBODIMENTS

Embodiments of the present disclosure will be described below with reference to the attached drawings.

1. Object Recognition Device

Figure 1:
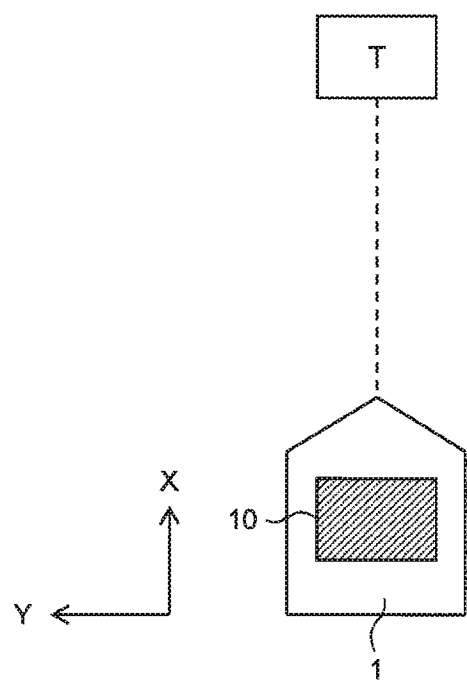
FIG. 1 is a conceptual diagram for explaining an object recognition device according to an embodiment of the present disclosure.

FIG. 1 is a conceptual diagram for explaining an object recognition device 10 according to an embodiment. The object recognition device 10 is installed on a vehicle 1 and executes "object recognition processing" that recognizes an object T around the vehicle 1. A result of the object recognition processing is used for driving support control, autonomous driving control, and the like. In the following description, an X-direction represents a longitudinal direction of the vehicle 1 and a Y-direction represents a lateral direction of the vehicle 1.

Figure 2:
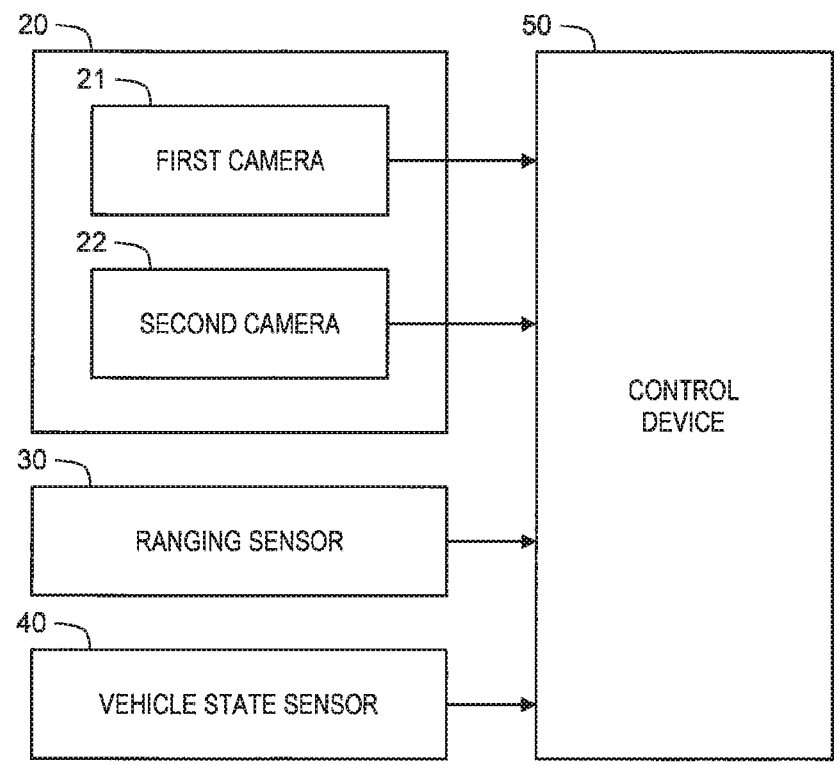
FIG. 2 is a block diagram showing a configuration example of the object recognition device according to the embodiment of the present disclosure.

FIG. 2 is a block diagram showing a configuration example of the object recognition device 10 according to the present embodiment. The object recognition device 10 is provided with a camera device 20, a ranging sensor 30, a vehicle state sensor 40, and a control device (controller) 50.

The camera device 20 images a situation around the vehicle 1. In the present embodiment, the camera device 20 includes multiple cameras having different optical properties. For example, the camera device 20 includes multiple cameras having different angles of view. In the example shown in FIG. 2, the camera device 20 includes a first camera 21 and a second camera 22. For example, the first camera 21 is a wide angle camera having a relatively large angle of view, and the second camera 22 is a telephoto camera having a relatively small angle of view.

The ranging sensor 30 includes at least one of a radar and a LIDAR (Laser Imaging Detection and Ranging). The ranging sensor 30 outputs a transmission wave and receives a reflected wave from the object T. It is possible to calculate a position (i.e. a distance and a direction) and a velocity of the object T based on reception state of the reflected waves.

The vehicle state sensor 40 detects a sate of the vehicle 1. For example, the vehicle state sensor 40 includes a vehicle speed sensor, a yaw rate sensor, and so forth. The vehicle speed sensor detects a speed of the vehicle 1. The yaw rate sensor detects a yaw rate of the vehicle 1.

The control device (controller) 50 is a microcomputer including a processor and a memory device. The control device 50 is also called an ECU (Electronic Control Unit). Processing by the control device 50 is achieved by the processor executing a control program stored in the memory device. The processing by the control device 50 includes the object recognition processing that recognizes the object T around the vehicle 1. Hereinafter, the object recognition processing by the control device 50 will be described.

2. Outline of Object Recognition Processing

The control device 50 detects the object T around the vehicle 1 based on a result of imaging by the camera device 20 and a result of measurement by the ranging sensor 30. The object T detected based on the result of imaging by the first camera 21 is hereinafter referred to as a "first object T21". The object T detected based on the result of imaging by the second camera 22 is hereinafter referred to as a "second object T22". The object T detected based on the result of measurement by the ranging sensor 30 is hereinafter referred to as a "third object T30". A detected position of each object T is defined by a distance and a direction. The detected position (distance, direction) of each object T includes an error.

Moreover, the control device 50 executes fusion processing. More specifically, the control device 50 determines whether or not the third object T30 is the same as at least one of the first object T21 and the second object T22. When it is determined that the third object T30 is the same as at least one of the first object T21 and the second object T22, the control device 50 recognizes the third object T30 and the at least one as a same (identical) object.

However, as described above, the detected position of each object T includes an error. Therefore, not the detected position itself but a "determination range (error range)" considering the error is used for the identification determination in the fusion processing. The determination range is a range including the object T.

Figure 3:
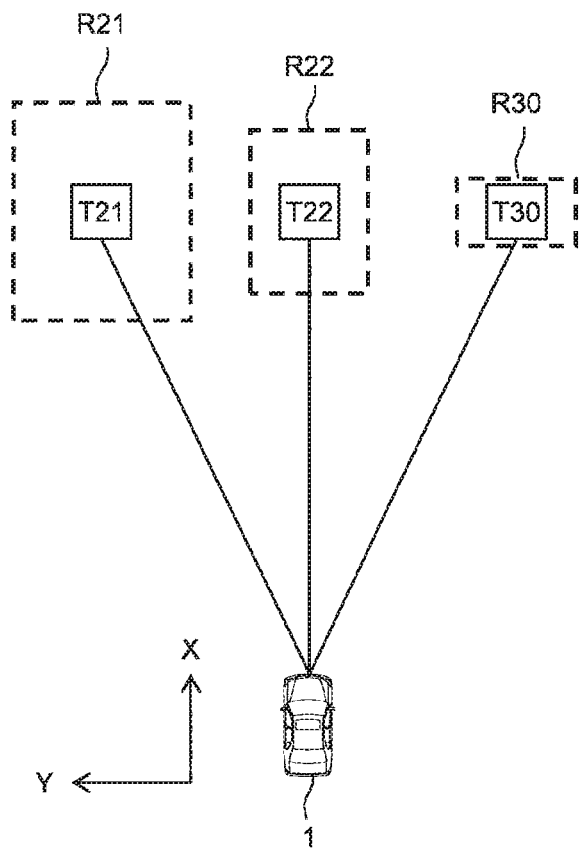
FIG. 3 is a conceptual diagram for explaining object recognition processing according to the embodiment of the present disclosure.

FIG. 3 conceptually shows the determination range in the XY plane. A first determination range R21, which is the determination range with respect to the detected position of the first object T21, includes the first object T21. A second determination range R22, which is the determination range with respect to the detected position of the second object T22, includes the second object T22. A third determination range R30, which is the determination range with respect to the detected position of the third object T30, includes the third object T30. Typically, the first determination range R21 and the second determination range R22 are larger than the third determination range R30. A shape of each determination range is rectangular in the example shown in FIG. 3, but not limited to that.

It should be noted here that the first camera 21 and the second camera 22 have different optical properties as described above. Therefore, reliability (accuracy) of the detected position of the first object T21 is different from reliability of the detected position of the second object T22. If the first determination range R21 and the second determination range R22 are set to have a same size, the determination range may be unreasonably wide or narrow from a viewpoint of true reliability. When the first determination range R21 and the second determination range R22 are unreasonably wide or narrow, accuracy of the fusion processing is deteriorated. This causes false recognition of objects.

In view of the above, according to the present embodiment, the first determination range R21 and the second determination range R22 are set independently of each other in consideration of respective optical properties of the first camera 21 and the second camera 22. More specifically, the first determination range R21 is flexibly set according to the reliability of the detected position of the first object 121. The first determination range R21 is smaller as the reliability is higher, and the first determination range R21 is larger as the reliability is lower. Similarly, the second determination range R22 is flexibly set according to the reliability of the detected position of the second object 122. The second determination range R22 is smaller as the reliability is higher, and the second determination range R22 is larger as the reliability is lower.

Flexibly setting the first determination range R21 and the second determination range R22 according to the reliability of detected object position can prevent the first determination range R21 and the second determination range R22 from being unreasonably wide or narrow. As a result, accuracy of the fusion processing increases and thus false recognition of objects is suppressed. Moreover, accuracy of the driving support control and the autonomous driving control utilizing a result of the object recognition processing also increases. This contributes to increase in a driver's confidence in the driving support control and the autonomous driving control.

3. Example of Object Recognition Processing

Figure 4:
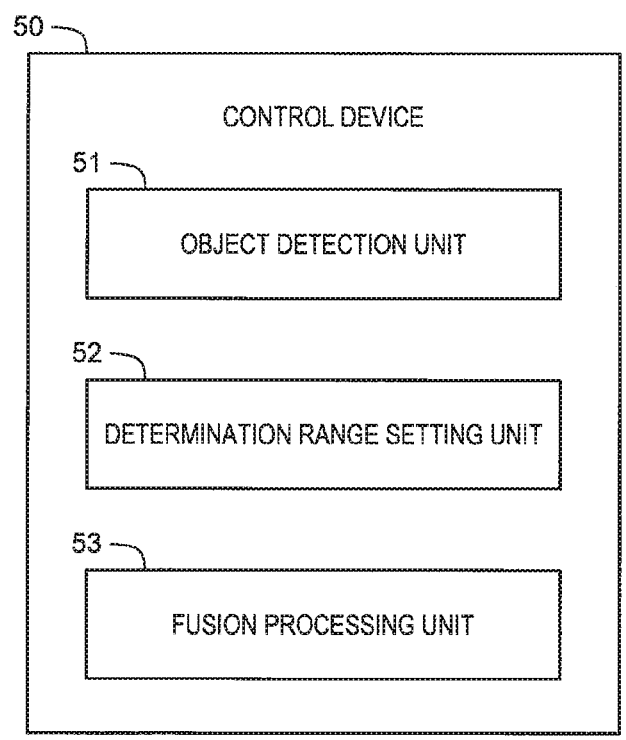
FIG. 4 is a block diagram showing a functional configuration example of a control device of the object recognition device according to the embodiment of the present disclosure.

FIG. 4 is a block diagram showing a functional configuration example of the control device 50 of the object recognition device 10 according to the present embodiment. The control device 50 has an object detection unit 51, a determination range setting unit 52, and a fusion processing unit 53 as functional blocks. These functional blocks are achieved by the processor of the control device 50 executing a control program stored in the memory device.

Figure 5:
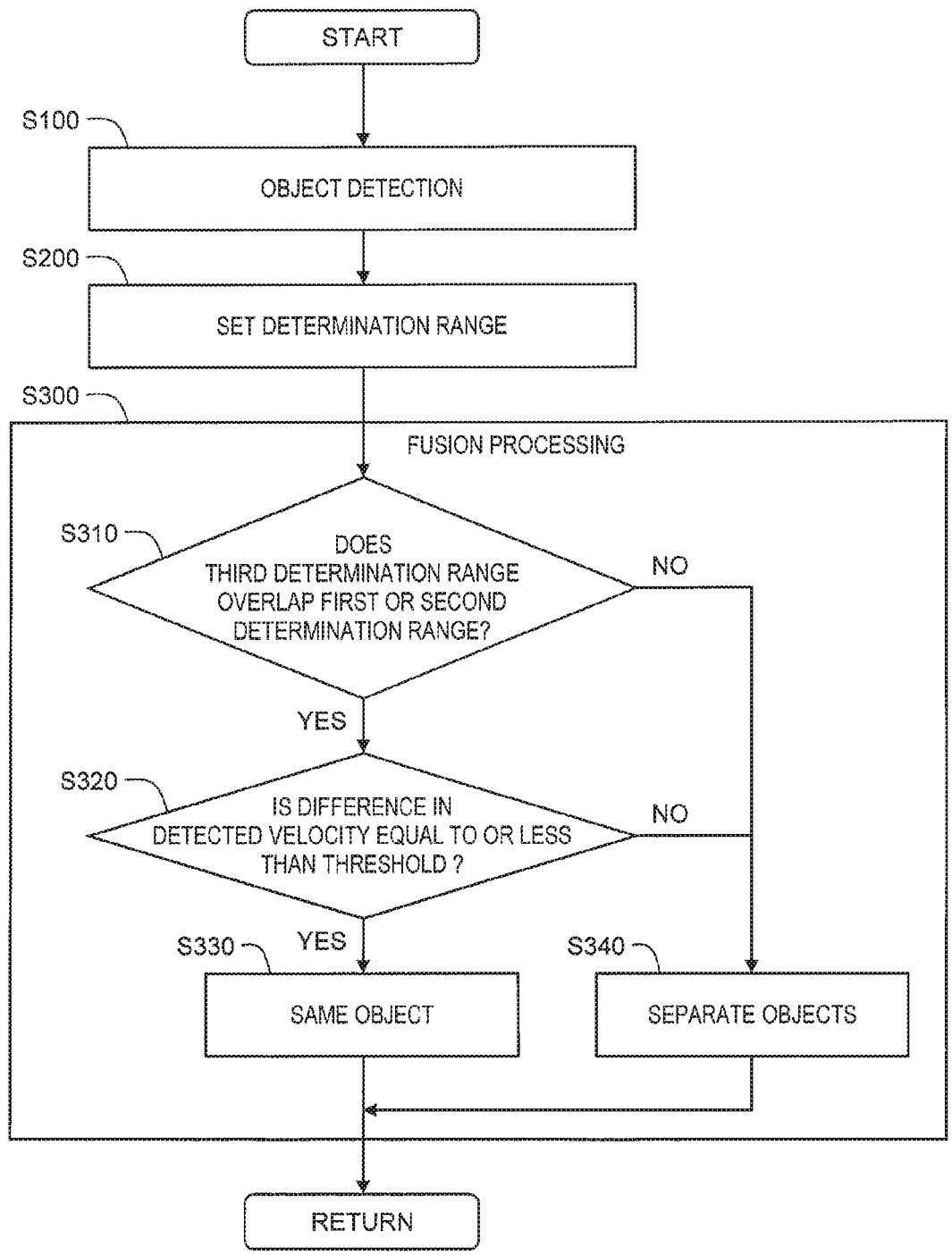
FIG. 5 is a flow chart showing the object recognition processing according to the embodiment of the present disclosure.

FIG. 5 is a flow chart showing the object recognition processing according to the present embodiment. Hereinafter, each Step of the object recognition processing will be described in detail.

3-1. Step S100 (Object Detection Processing)

The object detection unit 51 detects the first object T21 based on the result of imaging by the first camera 21. Moreover, the object detection unit 51 detects the second object T22 based on the result of imaging by the second camera 22. Then, the object detection unit 51 acquires information of respective detected positions (distances, directions) of the first object T21 and the second object T22. Furthermore, the object detection unit 51 may calculate respective relative velocities of the first object T21 and the second object 722. A method of calculating a position and a velocity of an object based on imaging information is well known.

In addition, the object detection unit 51 detects the third object T30 based on the result of measurement by the ranging sensor 30. Then, the object detection unit 51 acquires information of a detected position (distance, direction) of the third object T30. Furthermore, the object detection unit 51 may calculate a relative velocity of the third object T30. A method of calculating a position and a velocity of an object based on a result of measurement by the radar or the LIDAR is well known.

3-2. Step S200 (Determination Range Setting Processing)

The determination range setting unit 52 sets the determination range (see FIG. 3) used in the subsequent fusion processing (Step S300). That is, the determination range setting unit 52 sets the first determination range R21 with respect to the detected position of the first object T21. The determination range setting unit 52 sets the second determination range R22 with respect to the detected position of the second object T22. The determination range setting unit 52 sets the third determination range R30 with respect to the detected position of the third object T30. In the present embodiment, the setting of the third determination range R30 is not limited in particular.

The first determination range R21 is set according to the reliability of the detected position of the first object T21. The first determination range R21 is smaller as the reliability is higher, and the first determination range R21 is larger as the reliability is lower.

An example of a parameter contributing to the reliability of the detected position of the first object 121 is a "pixel density" of the first object T21 detected. The pixel density of the first object T21 is hereinafter referred to as a "first pixel density". The first pixel density depends on the detected distance of the first object T21, an angle of view and a number of pixels of the first camera 21. The first pixel density is lower as the detected distance of the first object T21 is larger. The first pixel density is lower as the angle of view of the first camera 21 is larger. The first pixel density is lower as the number of pixels of the first camera 21 is smaller. The determination range setting unit 52 calculates the first pixel density based on the detected distance of the first object T21, the angle of view and the number of pixels of the first camera 21. The angle of view and the number of pixels of the first camera 21, which are known parameters, are beforehand registered in the memory device of the control device 50.

Figure 6:
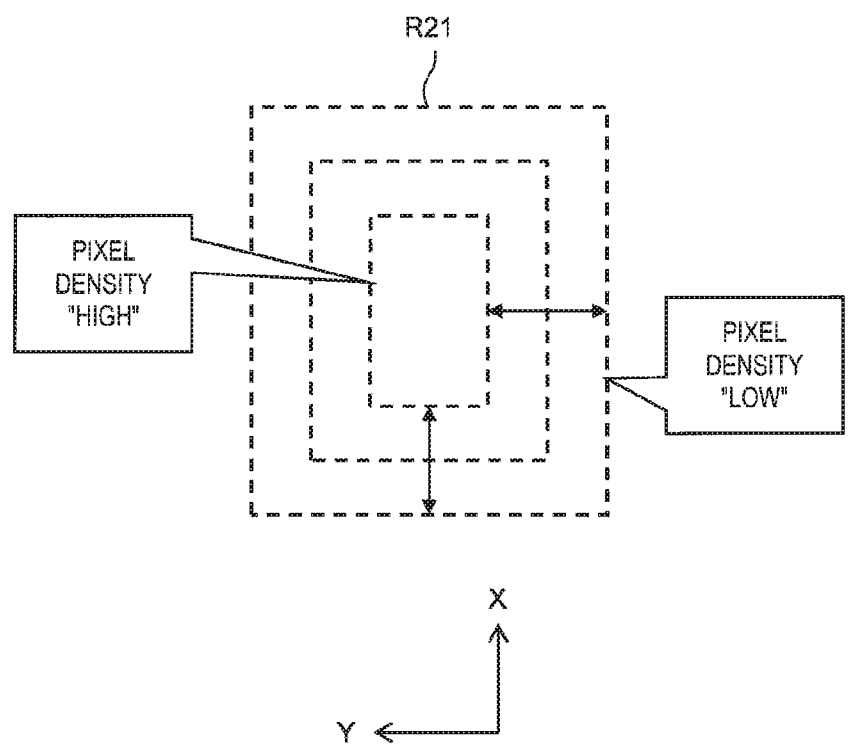
FIG. 6 is a conceptual diagram for explaining setting of a determination range according to a pixel density in the object recognition processing according to the embodiment of the present disclosure.

FIG. 6 is a conceptual diagram for explaining setting of the first determination range R21 according to the first pixel density. The lower the first pixel density is, the lower the reliability of the detected position of the first object T21 is. Therefore, the determination range setting unit 52 sets the first determination range R21 larger as the first pixel density is lower. Conversely, the determination range setting unit 52 sets the first determination range R21 smaller as the first pixel density is higher. For example, a base pixel density and a base determination range corresponding to the base pixel density are set in advance. The determination range setting unit 52 determines the first determination range R21 by enlarging or reducing the base determination range according to a ratio of the first pixel density to the base pixel density. It should be noted that the size of the first determination range R21 varies in both the X-direction and the Y-direction as shown in FIG. 6.

The same applies to the second determination range R22. The second determination range R22 is set to be larger as the reliability of the detected position of the second object T22 is lower. The reliability of the detected position of the second object T22 depends on a "second pixel density" being a pixel density of the second object T22 detected. The determination range setting unit 52 calculates the second pixel density based on the detected distance of the second object T22, the angle of view and the number of pixels (known parameters) of the second camera 22. Then, the determination range setting unit 52 sets the second determination range R22 larger as the second pixel density is lower. Conversely, the determination range setting unit 52 sets the second determination range R22 smaller as the second pixel density is higher.

Figure 7:
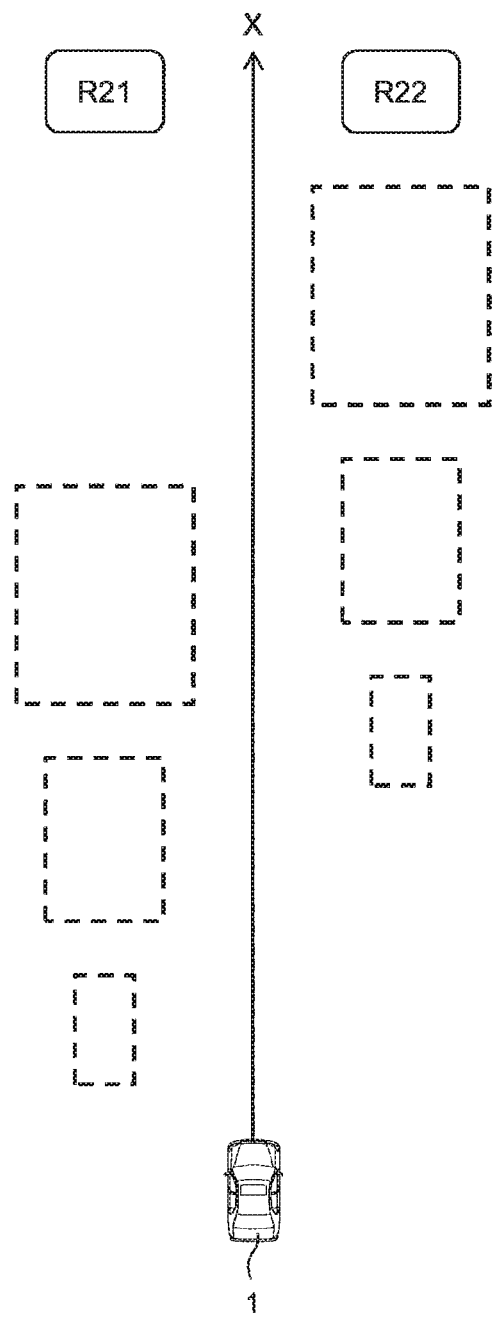
FIG. 7 is a conceptual diagram for explaining setting of the determination range in the object recognition processing according to the embodiment of the present disclosure.

FIG. 7 shows examples of the first determination range R21 and the second determination range R22. In the examples, the first camera 21 is a wide angle camera, the second camera 22 is a telephoto camera, and the angle of view of the first camera 21 is larger than the angle of view of the second camera 22. The first determination range R21 and the second determination range R22 each becomes larger with increasing distance from the vehicle 1. Under a condition where the distances are the same and the numbers of pixels are the same, the first determination range R21 regarding the first camera 21 having the larger angle of view is larger than the second determination range R22 regarding the second camera 22 having the smaller angle of view.

Another example of a parameter contributing to the reliability of the detected position of the first object T21 is an "angle-of-view variation" of the first camera 21 caused by oscillation of the vehicle 1. The angle-of-view variation of the first camera 21 caused by oscillation of the vehicle 1 is hereinafter referred to as a "first angle-of-view variation". The first angle-of-view variation depends on the angle of view of the first camera 21 and an oscillating period of the vehicle 1. The first angle-of-view variation is larger as the angle of view of the first camera 21 is smaller. The first angle-of-view variation is larger as the oscillating period of the vehicle 1 is shorter. The oscillating period of the vehicle 1 is calculated, for example, from a variation of the yaw rate detected by the vehicle state sensor 40. The determination range setting unit 52 calculates the first angle-of-view variation based on the angle of view (known parameter) of the first camera 21 and the oscillating period of the vehicle 1.

Figure 8:
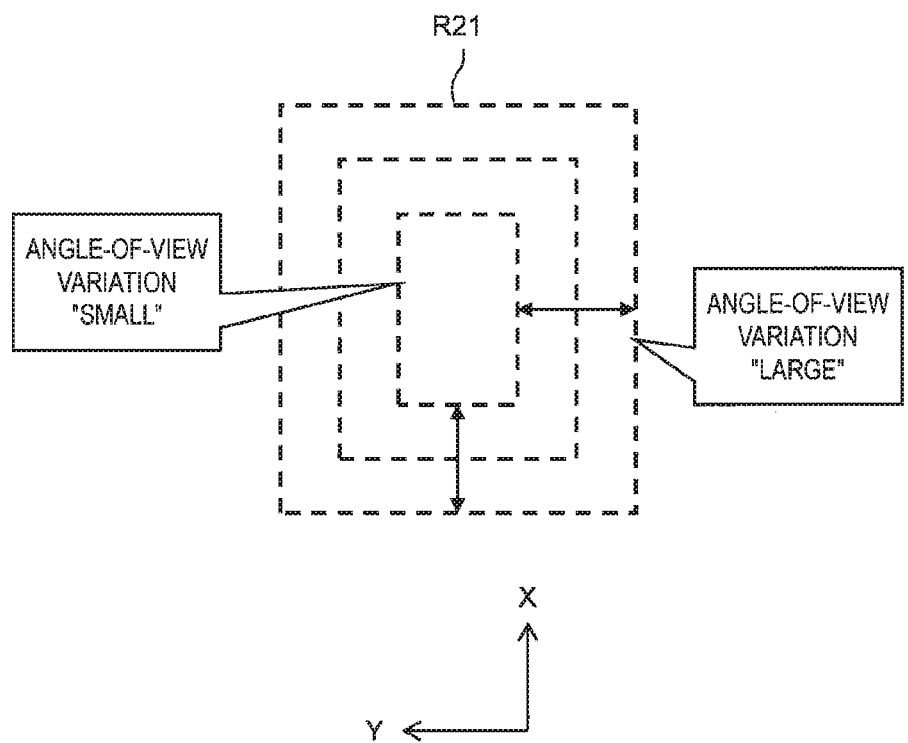
FIG. 8 is a conceptual diagram for explaining setting of the determination range according to angle-of-view variation in the object recognition processing according to the embodiment of the present disclosure.

FIG. 8 is a conceptual diagram for explaining setting of the first determination range R21 according to the first angle-of-view variation. The larger the first angle-of-view variation is, the lower the reliability of the detected position of the first object T21 is. Therefore, the determination range setting unit 52 sets the first determination range R21 larger as the first angle-of-view variation is larger. Conversely, the determination range setting unit 52 sets the first determination range R21 smaller as the first angle-of-view variation is smaller. For example, a base angle-of-view variation and a base determination range corresponding to the base angle-of-view variation are set in advance. The determination range setting unit 52 determines the first determination range R21 by enlarging or reducing the base determination range according to a ratio of the first angle-of-view variation to the base angle-of-view variation.

The same applies to the second determination range R22. The reliability of the detected position of the second object T22 depends on a "second angle-of-view variation" being an angle-of-view variation of the second camera 22 caused by the oscillation of the vehicle 1. The determination range setting unit 52 calculates the second angle-of-view variation based on the angle of view (known parameter) of the second camera 22 and the oscillating period of the vehicle 1. Then, the determination range setting unit 52 sets the second determination range R22 larger as the second angle-of-view variation is larger. Conversely, the determination range setting unit 52 sets the second determination range R22 smaller as the second angle-of-view variation is smaller.

Figure 9:
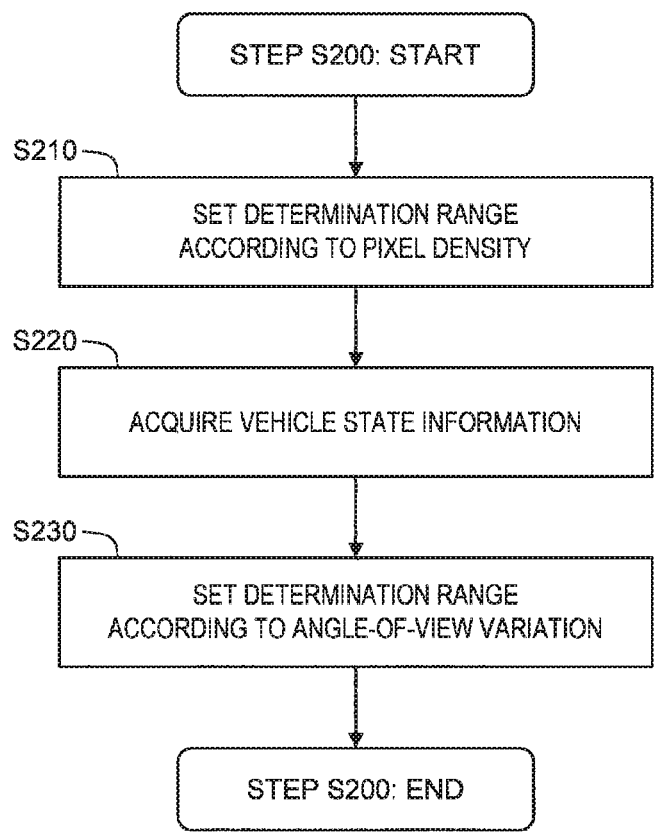
FIG. 9 is a flow chart showing an example of Step S200 of the object recognition processing according to the embodiment of the present disclosure.

FIG. 9 is a flow chart showing an example of the determination range setting processing (Step S200). In Step S210, the determination range setting unit 52 sets the determination range with respect to the detected position of the detected object according to the pixel density of the detected object. In Step S220, the determination range setting unit 52 acquires vehicle state information such as the yaw rate detected by the vehicle state sensor 40. In Step S230, the determination range setting unit 52 calculates the angle-of-view variation based on the vehicle state information and sets (modifies) the determination range according to the angle-of-view variation.

It should be noted that although the determination range is set in consideration of both the pixel density and the angle-of-view variation in the example shown in FIG. 9, the present embodiment is not limited to that. Even when one of the pixel density and the angle-of-view variation is taken into consideration, the setting of the determination range becomes more appropriate as compared with the conventional technique where none of them is taken into consideration. When both of the pixel density and the angle-of-view variation are taken into consideration, the setting of the determination range becomes further more appropriate, which is preferable.

3-3. Step S300 (Fusion Processing)

The fusion processing unit 53 executes the fusion processing. More specifically, the fusion processing unit 53 compares the third determination range R30 with the first determination range R21 and the second determination range R22 to determine whether or not the third object T30 is the same as at least one of the first object T21 and the second object T22. When the third object T30 is determined to be the same as at least one of the first object T21 and the second object T22, the fusion processing unit 53 recognizes the third object T30 and the at least one as a same (identical) object.

Figure 10:
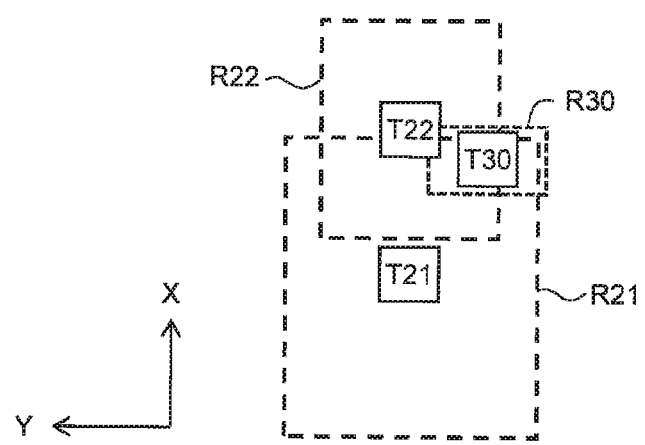
FIG. 10 is a conceptual diagram for explaining fusion processing in the object recognition processing according to the embodiment of the present disclosure.

In the example shown in FIG. 5, not only the determination range but also the velocity is taken into consideration. More specifically, in Step S310, the fusion processing unit 53 determines whether or not the third determination range R30 overlaps at least one one of the first determination range R21 and the second determination range R22. FIG. 10 shows a case where the third determination range R30 overlaps the first determination range R21 and the second determination range R22. When the third determination range R30 overlaps at least one of the first determination range R21 and the second determination range R22 (Step S310; Yes), the processing proceeds to Step S320. Otherwise (Step S310; No), the processing proceeds to Step S340.

In Step S320, detected velocities of two objects respectively included in the overlapping two determination ranges are considered. More specifically, the fusion processing unit 53 determines whether or not a difference in the detected velocity between the two objects is equal to or less than a threshold. When the difference in the detected velocity is equal to or less than the threshold (Step S320; Yes), the processing proceeds to Step S330. Otherwise (Step S320; No), the processing proceeds to Step S340.

In Step S330, the fusion processing unit 53 determines that the two objects are the same (identical) and recognizes the two objects as the same object.

In Step S340, the fusion processing unit 53 determines that the two objects are separated and recognizes the two objects as separate objects.

It should be noted that in the fusion processing, consistency of object sizes and object types (e.g. a vehicle, a pedestrian) may be further taken into consideration.

According to the present embodiment, as described above, the first determination range R21 and the second determination range R22 used in the fusion processing are flexibly set according to the reliability of the detected object position. The reliability of the detected object position is determined based on at least one of the pixel density and the angle-of-view variation. Flexible setting according to the reliability can prevent the first determination range R21 and the second determination range R22 from being unreasonably wide or narrow. As a result, accuracy of the fusion processing increases and thus false recognition of objects is suppressed. Moreover, accuracy of the driving support control and the autonomous driving control utilizing a result of the object recognition processing also increases. This contributes to increase in a driver's confidence in the driving support control and the autonomous driving control.

4. Vehicle Travel Control System

Figure 11:
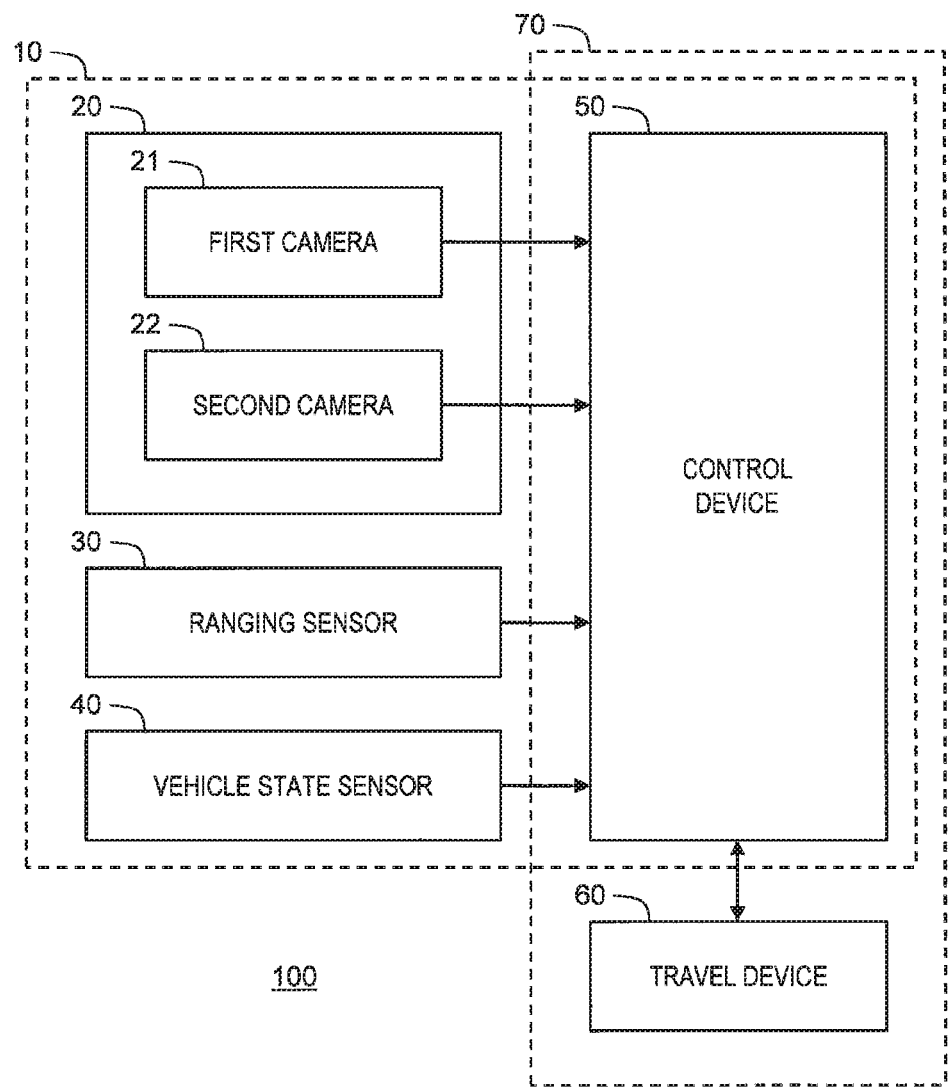
FIG. 11 is a block diagram showing a configuration example of a vehicle travel control system according to the embodiment of the present disclosure.

FIG. 11 is a block diagram showing a configuration example of a vehicle travel control system 100 according to the present embodiment. The vehicle travel control system 100 is installed on the vehicle 1 and executes "vehicle travel control" that controls travel of the vehicle 1.

More specifically, the vehicle travel control system 100 is provided with a travel device 60 in addition to the above-described object recognition device 10. The travel device 60 includes a steering device, a driving device, and a braking device. The steering device turns wheels. The driving device is a power source that generates a driving force. The driving device is exemplified by an engine and an electric motor. The braking device generates a braking force.

The control device 50 executes the vehicle travel control based on a result of the object recognition by the object recognition device 10. The vehicle travel control includes steering control and acceleration/deceleration control. The control device 50 executes the steering control by appropriately actuating the steering device. Moreover, the control device 50 executes the acceleration/deceleration control by appropriately actuating the driving device and the braking device. It can be said that the control device 50 and the travel device 60 constitute a "vehicle travel control device 70" that executes the vehicle travel control.

In the vehicle travel control, the vehicle travel control device 70 considers the reliability of the detected object position. The vehicle travel control device 70 sets an upper limit of a control amount in the vehicle travel control higher as the reliability is higher. That is to say, the vehicle travel control device 70 permits larger steering and higher acceleration/deceleration as the reliability is higher. Thus, vehicle behavior is prevented from changing greatly when the reliability of the detected object position is low. As a result, the driver's feeling of strangeness about the vehicle travel control is suppressed.

Figure 12:
FIG. 12 is a conceptual diagram for explaining vehicle travel control by the vehicle travel control system according to the embodiment of the present disclosure.

FIGS. 12 and 13 are conceptual diagrams for explaining an example of the vehicle travel control considering the reliability of the detected object position. A first position reliability S21 is the reliability of the detected position of the first object T21 detected by the first camera 21. As described above, the first position reliability S21 is associated with the first determination range R21 and is determined based on at least one of the first pixel density and the first angle-of-view variation. Similarly, a second position reliability S22 is the reliability of the detected position of the second object 122 detected by the second camera 22. As described above, the second position reliability S22 is associated with the second determination range R22 and is determined based on at least one of the second pixel density and the second angle-of-view variation.

In the example shown in FIG. 12, the first position reliability S21 and the second position reliability S22 are defined with respect to each of distance ranges D1 to D4. Among the distance ranges D1 to D4, the distance range D1 is nearest from the vehicle 1 and the distance range D4 is farthest from the vehicle 1. The first camera 21 is a wide angle camera, and the second camera 22 is a telephoto camera. In the distance range comparatively near to the vehicle 1, the first position reliability S21 regarding the first camera 21 is comparatively high. On the other hand, in the distance range comparatively far from the vehicle 1, the second position reliability S22 regarding the second camera 22 is comparatively high. An average position reliability SA is an average value of the first position reliability S21 and the second position reliability S22.

FIG. 13 shows an example of setting of an upper deceleration limit DL according to the average position reliability SA. The upper deceleration limit DL is set to be higher as the average position reliability SA is higher. Moreover, whether or not the same object is detected by the ranging sensor 30 may be taken into consideration. It can be said that the position reliability is further higher when the same object is detected by the ranging sensor 30 (Step S330 in FIG. 5). Therefore, the upper deceleration limit DL is set to be higher as compared with a case where the same object is not detected by the ranging sensor 30. When the position reliability is low, the vehicle travel control device 70 may issue a warning to the driver without executing the deceleration control and so forth.

What is claimed is:

1. An object recognition device installed on a vehicle and comprising:
 a first camera;
 a second camera having an optical property different from that of the first camera;
 a ranging sensor including at least one of a radar and a LIDAR (Laser Imaging Detection and Ranging); and
 a controller configured to execute object recognition processing,
 wherein in the object recognition processing, the controller is configured to:
  detect a first object based on a result of imaging by the first camera;
  detect a second object based on a result of imaging by the second camera;
  detect a third object based on a result of measurement by the ranging sensor;
  set a first determination range with respect to a detected position of the first object;
  set a second determination range with respect to a detected position of the second object;
  set a third determination range with respect to a detected position of the third object; and
  compare the third determination range with the first determination range and the second determination range and, when the third object is determined to be a same as at least one of the first object and the second object, recognize the third object and the at least one of the first object and the second object as a same object,
 wherein a first pixel density being a pixel density of the first object is determined based on a detected distance of the first object, an angle of view and a number of pixels of the first camera, and
 a second pixel density being a pixel density of the second object is determined based on a detected distance of the second object, an angle of view and a number of pixels of the second camera,
 wherein the controller is further configured to set the first determination range larger as the first pixel density is lower, and to set the second determination range larger as the second pixel density is lower.

2. The object recognition device according to claim 1,
 wherein angle-of-view variations of the first camera and the second camera caused by oscillation of the vehicle are a first angle-of-view variation and a second angle-of-view variation, respectively,
 wherein the controller is further configure to set the first determination range larger as the first angle-of-view variation is larger, and to set the second determination range larger as the second angle-of-view variation is larger.

3. A vehicle travel control system comprising:
 the object recognition device according to claim 2; and
 a vehicle travel controller configured to execute vehicle travel control that controls travel of the vehicle based on a result of the object recognition processing,
 wherein position reliability of the first object is higher as the first determination range is smaller, and
 position reliability of the second object is higher as the second determination range is smaller,
 wherein the vehicle travel controller is further configured to set an upper limit of a control amount in the vehicle travel control higher as the position reliability is higher.

4. A vehicle travel control system comprising:
 the object recognition device according to claim 1; and
 a vehicle travel controller configured to execute vehicle travel control that controls travel of the vehicle based on a result of the object recognition processing,
 wherein position reliability of the first object is higher as the first determination range is smaller, and
 position reliability of the second object is higher as the second determination range is smaller,
 wherein the vehicle travel controller is further configured to set an upper limit of a control amount in the vehicle travel control higher as the position reliability is higher.

* * * * *